United States Patent [19]

Silzle et al.

[11] Patent Number: 5,682,461
[45] Date of Patent: Oct. 28, 1997

[54] METHOD OF TRANSMITTING OR STORING DIGITALIZED, MULTI-CHANNEL AUDIO SIGNALS

[75] Inventors: Andreas Silzle, Munich; Gerhard Stoll, Zolling; Guenther Theile, Thanning; Martin Link, Munich, all of Germany

[73] Assignee: Institut Fuer Rundfunktechnik GmbH, Munich, Germany

[21] Appl. No.: 307,665

[22] PCT Filed: Mar. 17, 1993

[86] PCT No.: PCT/EP93/00629

§ 371 Date: Nov. 21, 1994

§ 102(e) Date: Nov. 21, 1994

[87] PCT Pub. No.: WO93/19542

PCT Pub. Date: Sep. 30, 1992

[30] Foreign Application Priority Data

Mar. 24, 1992 [DE] Germany ............... 42 09 544.1

[51] Int. Cl.$^6$ ............................................. G10L 9/00
[52] U.S. Cl. ................. 395/2.14; 395/2.38; 395/2.39
[58] Field of Search ........................ 395/2.09, 2.1, 395/2.14, 2.38, 2.39, 2.12, 2.15; 381/36–37, 39, 41–50, 35

[56] References Cited

U.S. PATENT DOCUMENTS

| | | | |
|---|---|---|---|
| 4,790,016 | 12/1988 | Mazor | 381/36 |
| 4,972,484 | 11/1990 | Theile et al. | 395/2.36 |
| 5,230,038 | 7/1993 | Fielder et al. | 395/2.09 |
| 5,235,671 | 8/1993 | Mazor | 395/2.09 |
| 5,367,608 | 11/1994 | Veldhuis et al. | 395/2.38 |
| 5,479,562 | 12/1995 | Fielder et al. | 395/2.38 |
| 5,539,829 | 7/1996 | Lokhoff et al. | 381/2 |

FOREIGN PATENT DOCUMENTS

| | | |
|---|---|---|
| 0402973 | 12/1990 | European Pat. Off. . |
| 402973 | 12/1990 | European Pat. Off. . |
| 3440613 | 4/1986 | Germany . |
| 3639753 | 6/1988 | Germany . |

OTHER PUBLICATIONS

ICASSP 91—IEEE International Conference on Acoustics, Speech, and Signal Processing, Bd. 5, 14 Mai 1991, Toronto, CA, Seiten 3601–3604, "Subband Coding of Sterophonic Digital Audio Signals" R.G. Van Der Wall et al.

ICASSP 92—IEEE International Conference on Acoustics, Speech, and Signal Processing, Bd. 2, 23 März 1992, San Francisco, US Seiten 569–572 "Sum–Difference Stereo Transform Coding" J.D. Johnston et al.

ICASSP 89—IEEE International Conference on Acoustics, Speech and Signal Processing, Bd. 3, 23. Mai 1989, Glasgow, GB, "Perceptual Transform Coding of Wideband Stereo Signals" J.D. Johnston.

*Primary Examiner*—Benedict V. Safourek
*Assistant Examiner*—Ricky Ngo
*Attorney, Agent, or Firm*—Spencer & Frank

[57] ABSTRACT

In order to transmit or to store digitalized, multi-channel audio signals which are digitally represented by a plurality of spectral subband signals, at an encoder, subband signals of different audio channels but having the same frequency position are combined across channels according to a dynamic control signal. This control signal is derived from several audio channels by an audio signal analysis based on a psycho-acoustic binaural model. At a decoder, the subband signals of several audio channels but having the same frequency position are dissociated across channels according to a control value derived from the dynamic control signal, transmitted or stored therewith.

15 Claims, 7 Drawing Sheets

METHOD OF TRANSMITTING OR STORING DIGITALIZED, MULTI-CHANNEL AUDIO SIGNALS

BACKGROUND OF THE INVENTION

The invention relates to a method of transmitting or storing digitalized, multi-channel audio signals. More particularly, one aspect of the invention is directed to a transmitting or storing method of the type in which, on the encoder side, (a) each audio channel is represented digitally by a number of spectral subband signals, wherein for each subband signal quantized sampling values that are discrete in time are present; (b) the quantization of the sampling values is changed (coded) in the individual subbands according to the channel-specific, intra-channel perceptual threshold of human hearing in the sense of a reduction in irrelevance; (c) for each subband signal a scale factor (SCF) is determined that classes the peak value of the subband signal within a certain time interval (block) and that is used in the normalization of the subband signal prior to quantization; and (d) for the control of the quantization of the sampling values of each subband signal, a piece of bit allocation information (BAL) is obtained from an audio signal analysis and is stored or transmitted together with the determined scale factors (SCF) and the coded subband signals, and in which, on the decoder side, (e) the coded subband signals are decoded according to the bit allocation information (BAL) and the subband signal levels are denormalized according to the scale factors (SCF); and (f) the decoded and denormalized subband signals of each audio channel are combined into one broadband, digital audio signal.

For transmitting and storing digital audio signals, it is known (DE 34 40 613 and DE 36 39 753) to perform a data reduction with the aid of a coding in subbands, and with the use of a psychoacoustic model. In these cases the digitalized, broadband audio signal is represented by a number of spectral subband signals, and the quantization of the sampling values is effected in the individual subbands according to the perceptual threshold of human hearing. The data reduction factor for very high-value audio signals that can be achieved with this "monophonic coding" has approximately the value of 6 at a 46 kHz sampling frequency and 16-bit linear quantization, which corresponds to a data rate of 2×128 kbit/s per stereophonic audio signal.

Also known are measures for increasing the data reduction factor during coding of dual-channel, stereophonic signals, which are based on suppressing redundant signal components in the left and right channel, as well as such components which are irrelevant with regard to the stereophonic effect. Two different embodiments of this "stereophonic coding" are described in Netherland Patent Application No. 90 00 338 and in "Proceedings of the ICASP 1990" Perceptual Transform Coding of Wideband Stereo Signals, "namely periodic transmission of subband composite signals in the upper frequency range, and block-wise reconstruction of the subband signal level in the left and right channels with the aid of scale factors which represent the maximum signal level in the subbands of the left and right audio channels, and creation of sum (M=MONO) and differential (S=SIDES) signals from the left (L) and right (R) audio signal in accordance with the matrixing M=L+R and S=L−R, where the decoding of the sum signals and differential signals is effected according to the perceptual threshold determined for the sum signal M.

If the separate coding in the subbands of the left and right audio channels is supplemented by stereophonic coding in such a way that one of these methods or a combination of the two methods is employed, the data reduction factor of the value 6 can be increased to approximately the value 8. If, for example, a bit rate of 256 kbit/s is required for the transmission of two independent monosignals of the same quality as a 16-bit linear quantization, during stereophonic coding only 192 kbit/s are required for the transmission of a dual-channel stereo signal of the same subjective quality.

SUMMARY OF THE INVENTION

In contrast, the object of the invention is to achieve an even more substantial data reduction in dual-channel or multi-channel stereophonic signals.

This object is accomplished, according to one aspect of the invention, in that on the encoder side, the subband signals of different audio channels, but which have the same frequency position, are combined in an interchannel manner according to a dynamic control signal (COS) which is obtained by means of an audio signal analysis of a plurality of audio channels that is oriented toward a binaural, psychoacoustic model, and in that, on the decoder side, the subband signals of different audio channels, but the same frequency position, are decombined as a function of a control variable (COM), which is derived from the dynamic control signal (COS) and also transmitted or stored.

The invention is based on the consideration that the bit rate for a subband-coded, stereophonic signal can still be lowered considerably when diverse phenomena of spatial hearing and known models of binaural signal processing in human hearing are considered. Namely, it has been seen that a high information component of the stereophonic signal is irrelevant. In particular, human hearing can detect no spatial differences for certain spectral components and within certain time intervals, i.e. within certain time intervals a complete channel separation is not necessary for certain spectral ranges. Moreover, as a consequence of the effect of "adjacent-channel masking," the quantization or suppression of individual subband signals can be effected according to the highest adjacent-channel perceptual threshold when the associated common-channel perceptual threshold is lower. However, for the use of adjacent-channel masking, the effect of a reduced masking in spatially-separated masking ("Masking Level Difference," MLD) must be considered, and thus the playback arrangement must be defined. Such an optimization of stereophonic coding will be particularly significant in future digital audio systems having a higher number of transmission and playback channels. With the increase in audio channels, the directional stability of the audio representation in the image region between the front loudspeakers, and the possibilities of spatial audio representation increase. For this purpose, for example, the left and right loudspeakers are supplemented by a center loudspeaker and two surround loudspeakers, so that three further tone-transmission channels are necessary. In many cases, a bit rate that increases proportionally with the increase in the number of channels represents a too-high stress of the transmission capacity. For example, a doubling in the bit rate would already be unacceptable for additional center channels and surround channels in future digital audio broadcasting if the number of programs would have to be halved correspondingly.

Therefore, it is particularly desired to reduce the bit rate for five-channel, stereophonic audio signals (3 front signals L (left), C (center), R (right) and 2 surround signals LS (left-surround), RS (right-surround); abbreviated "3/2 stereo signals" of 5×(192:2)=480 kbit/s. An important condition for introducing multi-channel audio transmission systems is, in many case, compatibility with present digital, dual-channel stereo receivers. Because the transmission capacity is often too limited to transmit a complete multi-channel signal in addition to the conventional dual-channel signal according to ISO/EMPEC Standard 11172-3 corresponding to the simulcast principle, a dual-channel base signal Lo, Ro must be obtained with the aid of compatibility matrixings prior to transmission out of the multi-channel stereo signal, which is suited for playback with dual-channel stereo receivers. The following system of equations is provided as an example for a compatibility matrixing for five-channel (3/2) stereo signals:

$$T1 = L + xC + yLS = Lo \quad (1)$$

$$T2 = R + xC + yRS = Ro \quad (2)$$

$$T3 = xC \quad (3)$$

$$T4 = yLS \quad (4)$$

$$T5 = yRS \quad (5)$$

where x and y are coefficients in a range of, for example, 0.5 to 0.8.

The transmission signals T1 and T2 form the dual-channel stereo base signal packet Lo/Ro, while the additional transmission signals T3, T4, T5 contain the information required for dematrixing. If the original five-channel stereo signals L, C, R, LS, RS are supposed to be completely reconstructed on the decoder side, the dematrixing guide is as follows:

$$L' = T1 - T3 - T4 \quad (6)$$

$$R' = T2 - T3 - T5 \quad (7)$$

$$C' = T3/i \; x \quad (8)$$

$$LS' = T4/y \quad (9)$$

$$RS' = T5/y \quad (10)$$

A complete reconstruction of the original five-channel stereo signals is, however, not necessary, because—as already mentioned—hearing tolerates an incomplete channel partitioning for certain spectral ranges within certain time intervals. Correspondingly, certain subband signals of the transmission signals T3, T4 and T5 in equations (3), (4) and (5) can be periodically set at zero in a signal-dependent manner (so-called "puncture coding"). A further consideration is to decrease the data rate for the additional signal packet T3/T4/T5 as low as possible in that the signal components relevant for spatial perception are exclusively extracted. The coding of the stereo base signals Lo and Ro remains unaffected by this, so that compatibility with existing dual-channel decoders is ensured. Instead of a multi-channel audio representation, multilingual, simple programs or comment channels can also be provided, particularly for use in future television systems that have digital sound. In this case no matrixing is provided.

BRIEF DESCRIPTION OF THE DRAWINGS

The invention is described in detail below in conjunction with embodiments in the drawings, in which.

DESCRIPTION OF THE PREFERRED EMBODIMENTS

In the invention, in addition to redundancy, above all the limits of hearing are utilized as fully as possible in the spatial analysis of the audio field in the sense of a stereophonic coding, in that the bit allocation for individual subbands of individual audio channels is performed block-wise in accordance with a common analysis of the stereophonic signals of all audio channels. Here the quantization is not only established under consideration of the adjacent channel masking, but also under consideration of the subjectively sufficient channel partitioning, as will be explained in detail below.

A block-wise reduction of the channel partitioning of individual subband signals, which is controlled in a signal-dependent manner and is adapted to hearing, leads to a corresponding data reduction when the subband signals set to "mono" in the encoder are only transmitted in one of the channels and a suitable exchange of individual subband signals is possible in the decoder. The relevant subbands of the remaining audio channels are not transmitted. To this end networks ("combiners" or "decombiners") are provided in the encoder and in the decoder; these networks function according to control information that is also transmitted, is created from an encoder-side analysis, and allocates or links individual subband signals to individual audio channels in the same frequency range. As will be explained below, it is particularly advantageous to limit the subband-wise and block-wise reduction of the channel partitioning to the sampling values and to use the original scale factors of the individual audio channels, which were obtained on the side of the encoder and transmitted as additional information, for recovering the subband signal level.

Figure 1:
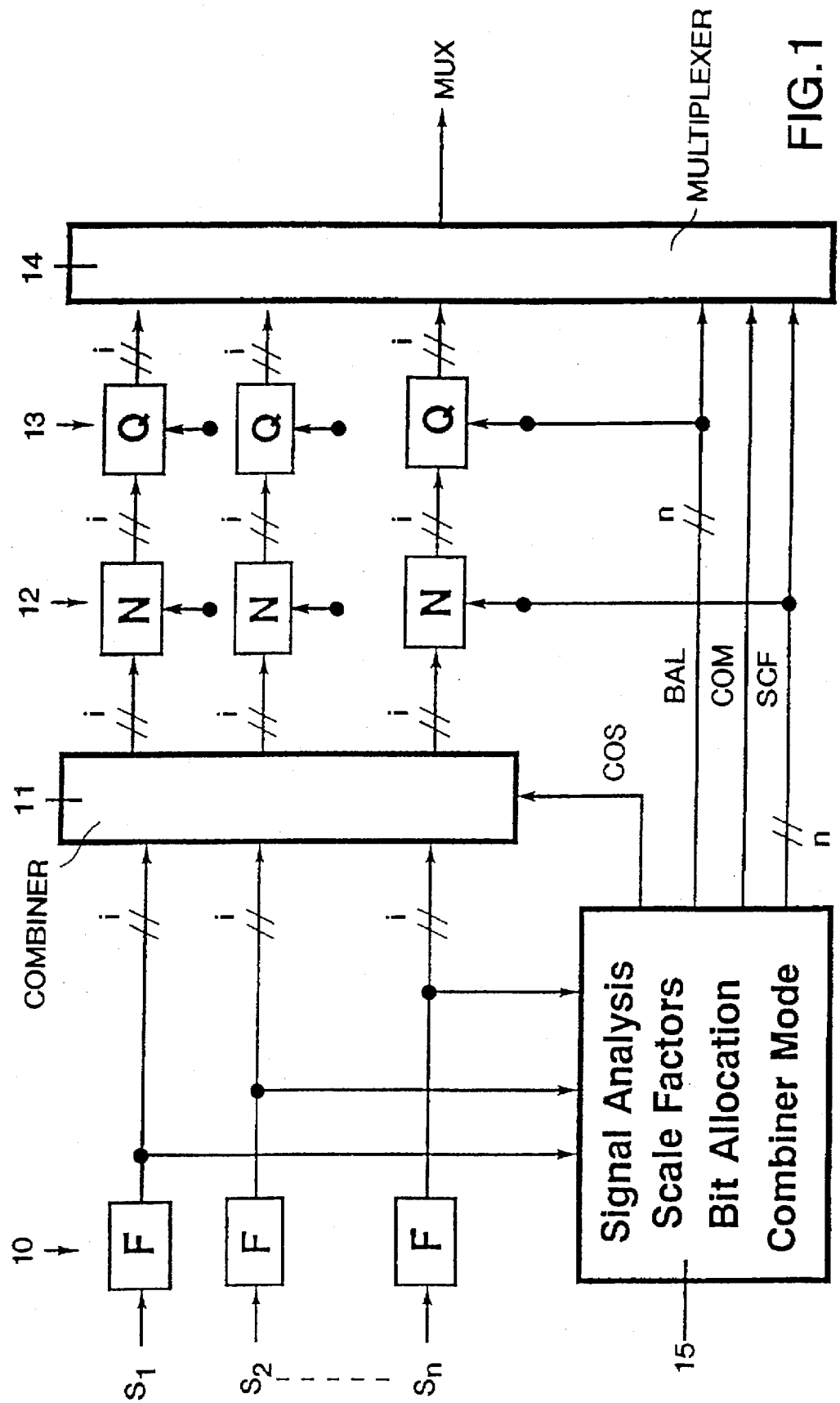
FIG. 1 is a basic diagram of an encoder for encoder-side execution of the method according to the invention.
Figure 2:
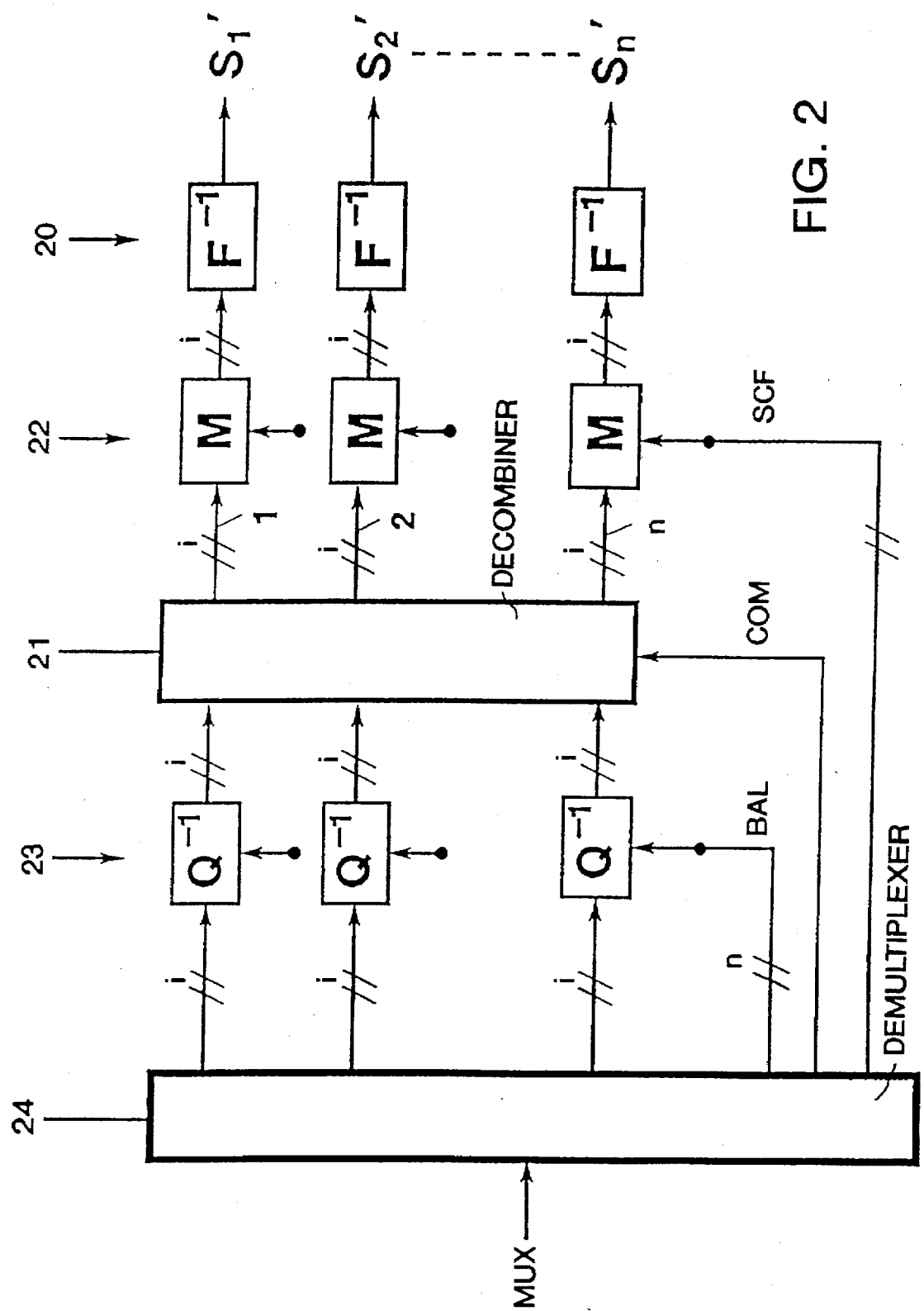
FIG. 2 is a basic diagram of a decoder for decoder-side execution of the method according to the invention.

An exemplary basic diagram of an encoder and a decoder for n audio channels ensues from FIGS. 1 and 2. In the encoder according to FIG. 1, the digitalized, linearly-quantized audio signals S1 through Sn are fed to a subband filter bank 10 and respectively separated into i subbands. The resulting nxi subband signals pass, one behind the other, through a combiner 11, a scaler 12 and a quantizer 13, and are combined, together with the additional information BAL (Bit Allocation Information) obtained in an analysis stage 15, COM (Combiner Mode Information) and SCF (Scale Factors) in a multiplexer 14 to form a multiplex signal MUX. From the analysis stage 15, a dynamic control signal COS is fed to the combiner 11, which signal controls an interchannel-wise combination of individual subband signals. In the scaler 12 the sampling values are normalized according to the scale factor information SCF, while the quantization of the normalized sampling values is performed in the quantizer 13 according to the bit allocation information BAL. How the calculation of all additional information for controlling the stages 11, 12, 13 is performed by the analysis stage 15 will be described in detail below.

In the decoder according to FIG. 2, after the separation of the received data stream MUX, the sampling values of the subband signals are recovered in normalized form in a dequantizer 23 downstream of the demultiplexer 24 with the aid of the transmitted bit allocation information BAL. In a decombiner 21, the recovered sampling values are divided subband-wise into n audio channels according to the combiner mode information COM. Only after this does a multiplication of the subband signals with the scale factors SCF take place in multiplier stages 22. After the inverse filtering of the denormalized subband signals in the synthesis filter banks 20, the broadband, digitalized audio signals S1' or Sn' are present at the outputs of the decoder according to FIG. 2.

Figure 3:
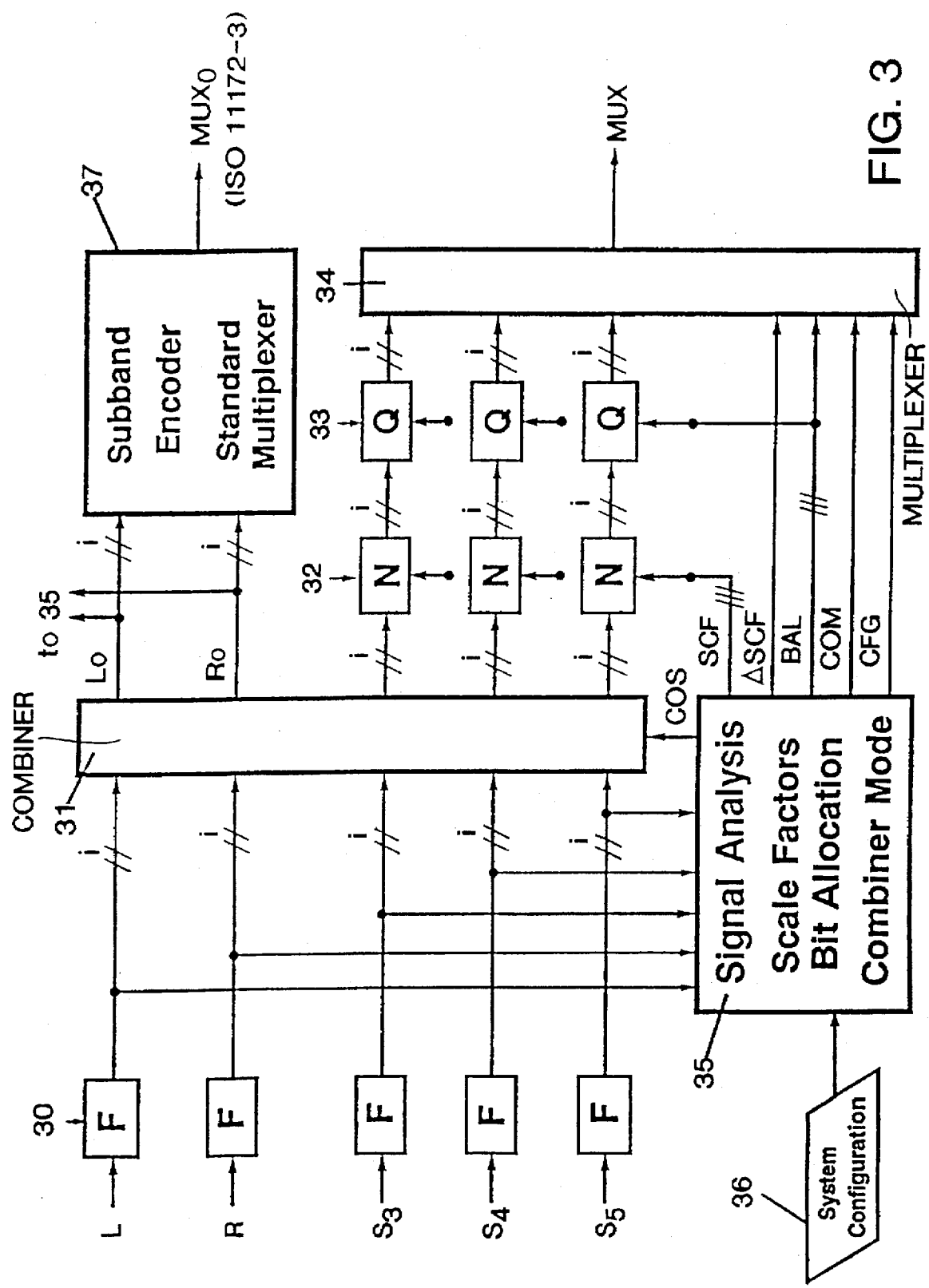
FIGS. 3 and 5 are basic diagrams of compatible encoders for five-channel, stereophonic audio signals.
Figure 4:
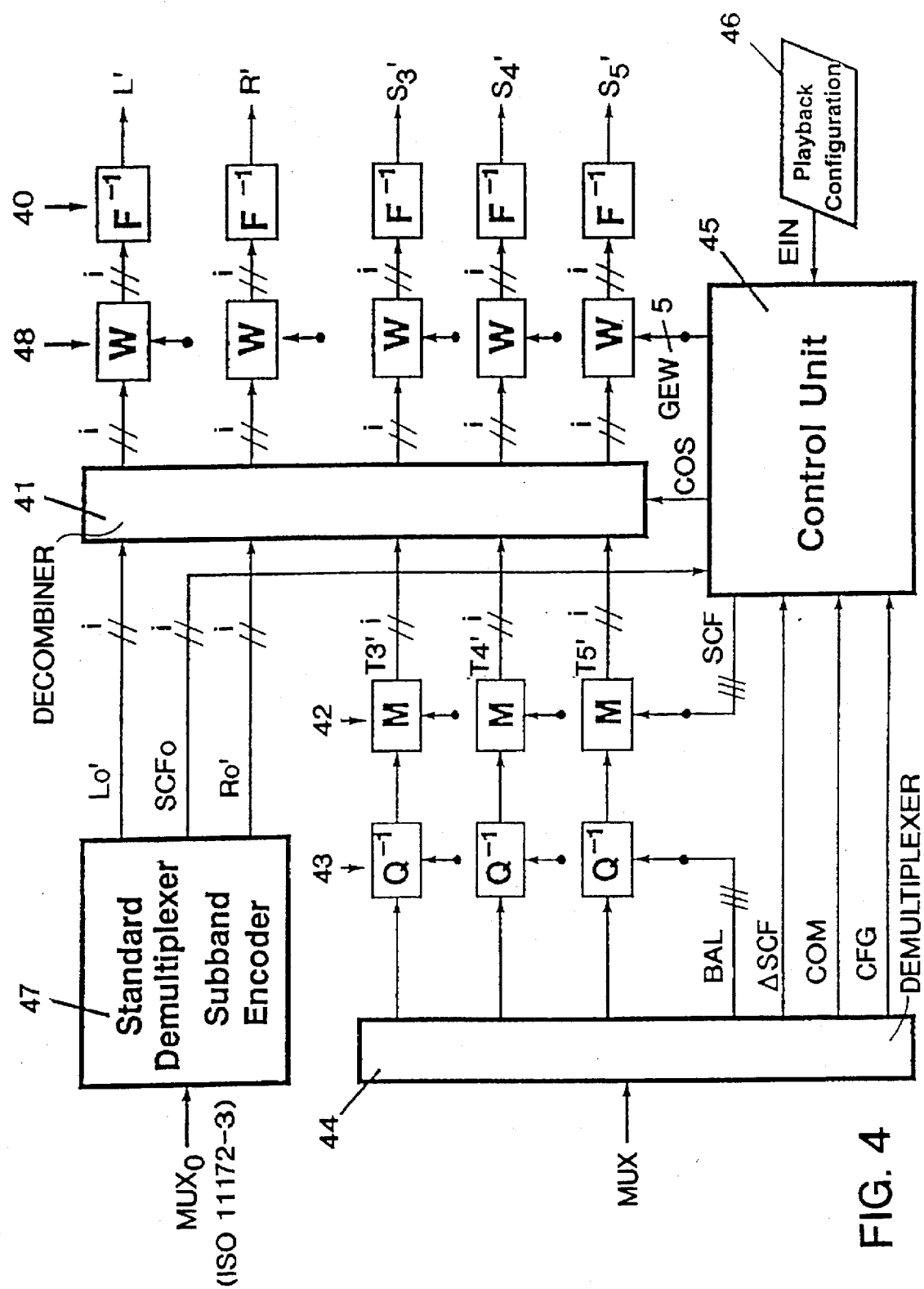
FIGS. 4 and 6 are basic diagrams of compatible decoders for five-channel, stereophonic audio signals.

A particular embodiment of the method according to the invention is represented in FIGS. 3 and 4. Considered here is the requirement mentioned at the outset of compatibility with existing subband coders according to the digital standard ISO 11172-3, as is the requirement of flexible use of the audio-transmission channels. The point of departure in the case of the encoder according to FIG. 3 is five-channel, stereophonic, digitalized audio signals, namely 3 front signals Left (L), Right (R) and Center (C) and two surround signals Left Surround (LS) and Right Surround (RS). For reasons of compatibility with existing standard subband coders, the front signals L and R, which are respectively filtered into i subbands in subband filters 30, are matrixed in a combiner 31, for example according to the above equations (1) and (2), to form a dual-channel, stereo base signal packet Lo'/Ro' which is subband-coded in a known way in a stage 37 designated as a "subband encoder and standard multiplexer" and converted into a standardized bitstream according to ISO Standard 11172-3, forming a compatible stereo signal MUXo.

The center signals and surround signals C, LS, RS, which are respectively filtered into i subbands in subband stages, are matrixed to a subband-filtered additional signal packet T3/T4/T5 in the combiner 31, for example according to equations (3) through (5). This additional signal packet T3/T4/T5 is subjected to a scaling (scaler 32), a quantization (quantizer 33) and a multiplex formation (multiplexer 34) in the same way as in FIG. 1, and the control of the stages 31, 32, 33 and 34 is again effected by an analysis stage 35. In comparison to the analysis stage 15 according to FIG. 1, the analysis stage 35 according to FIG. 3 additionally generates difference scale factor information SCF and configuration information CFG, which are inserted into the multiplex signal MUX of the multiplexer 34. From a user-operated system configuration input 36, the analysis stage 35 obtains application-dependent information about the type of desired processing of the input signals, for example a five-channel data reduction under consideration of the stereophonic irrelevance of all channels (surround audio representation) or a coding of the input signals C, LS, RS independently of the front signals L, R, for example for a multilingual television sound. In the latter example, LS, RS, C are not surround channels, but alternative voice channels, as will be described by way of FIG. 5. In addition to the n subband-filtered input signals, the analysis stage 35 obtains the subband-filtered stereo base signals Lo, Ro.

The above-named input signals are analyzed in the analysis stage 35 corresponding to the psychoacoustic model used there and the criteria derived therefrom, which will be described below. If the analysis reveals that a channel partitioning is not subjectively necessary, the channel partitioning is canceled in that subband signals of the additional signal packet C/LS/RS, which were determined with the aid of the bit allocation information BAL, are set to zero block-wise in the quantizer 33. The creation of the additional multiplex signal MUX in the multiplexer 34 also encompasses source-related error-control measures. The difference scale factor information SCF consists of the difference between the scale factors SCFo of the subbands of the stereo base signals Lo, Ro and the scale factors SCF of the subbands of the additional signals C, LS, RS, and thus permit a bit-saving coding of the scale factors SCF. Instead of an explicit transmission of the scale factors SCF in the multiplex signal MUX according to FIG. 1, in the encoder according to FIG. 3 only the difference values SCF are transmitted.

Figure 5:
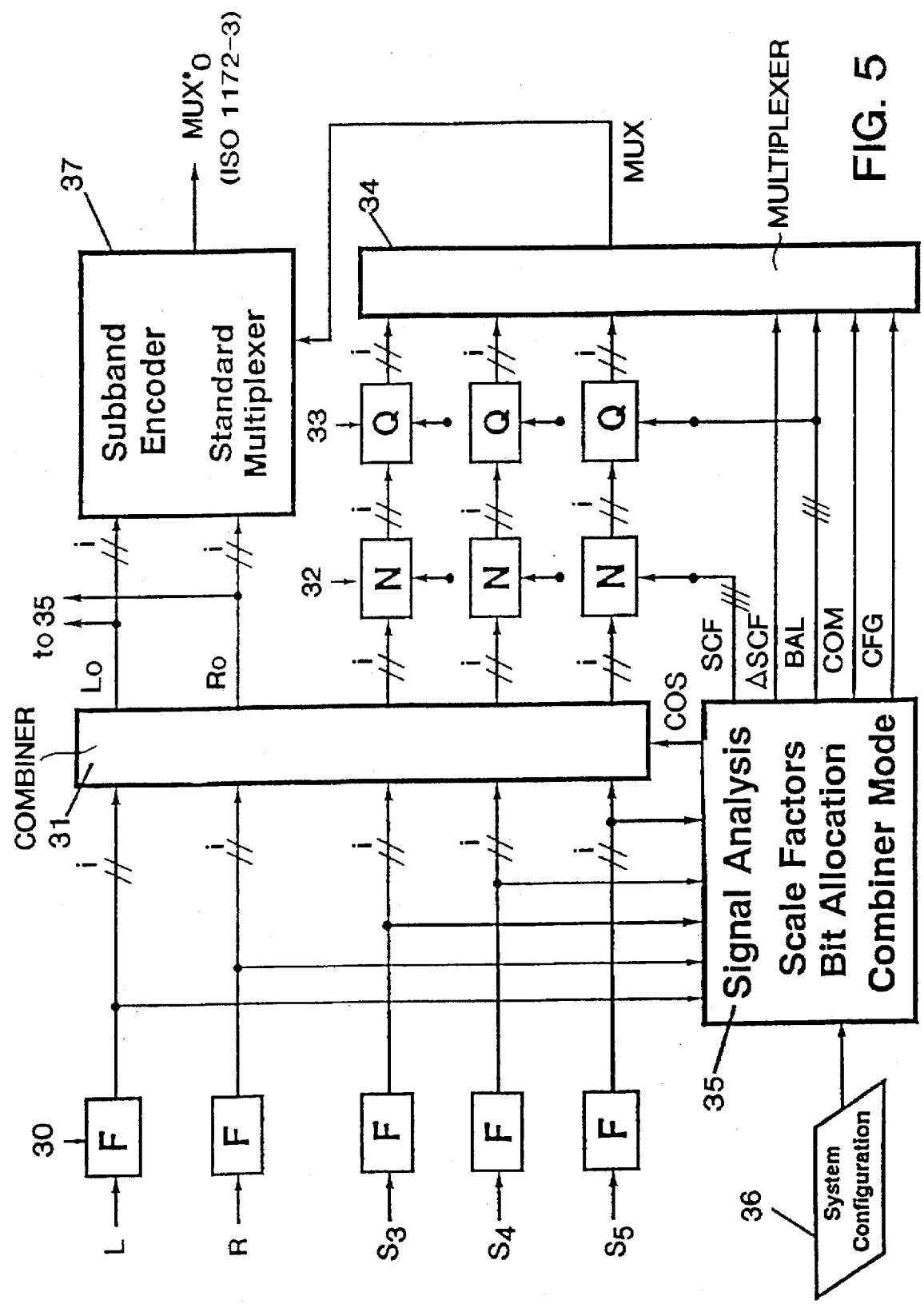

The resulting bitstreams MUX and MUXo of the encoder according to FIG. 3 are transmitted in an arbitrary manner in separate data blocks or stored. At the location of the decoder according to FIG. 4, it must be ensured that the two bitstreams MUX and MUXo are available simultaneously. It is also possible to transmit or store the resulting bitstreams MUX and MUXo in a higher-order multiplex. For this purpose, the bitstream MUX, for example, as shown in FIG. 5, is fed to the stage 37, which inserts the bitstream MUX into the bitstream MUXo in a suitable way, creating the combined bitstream MUXo*. This can be effected, for example, in a data stream according to ISO Standard 11172-3 in that the MUX data are inserted in each audio data frame inside a frame that is reserved for program-related data.

In the decoder according to FIG. 4, the subband signals of the dual-channel stereo base signal packet Lo'/Ro' are recovered in a known way from the bitstream MUXo in a stage 47 designated as "standard demultiplexer and subband decoder." Moreover, the subband signals of the additional signal packet are recovered from the bitstream MUX with the aid of dequantizers 43 and multipliers 42 after completed demultiplex formation in a demultiplexer 44. The necessary scale factors SCF of the subband signals C, LS, RS are calculated in a control unit 45 from the difference scale factor information supplied by the demultiplexer 44 and the scale factors SCFo of the subband base signals Lo, Ro supplied by the stage 47. As in the case of FIG. 2, the dequantizers 43 are controlled by the bit allocation information BAL, and the multipliers 42 are controlled by the scale factors SCF calculated in the control unit 45.

Figure 6:
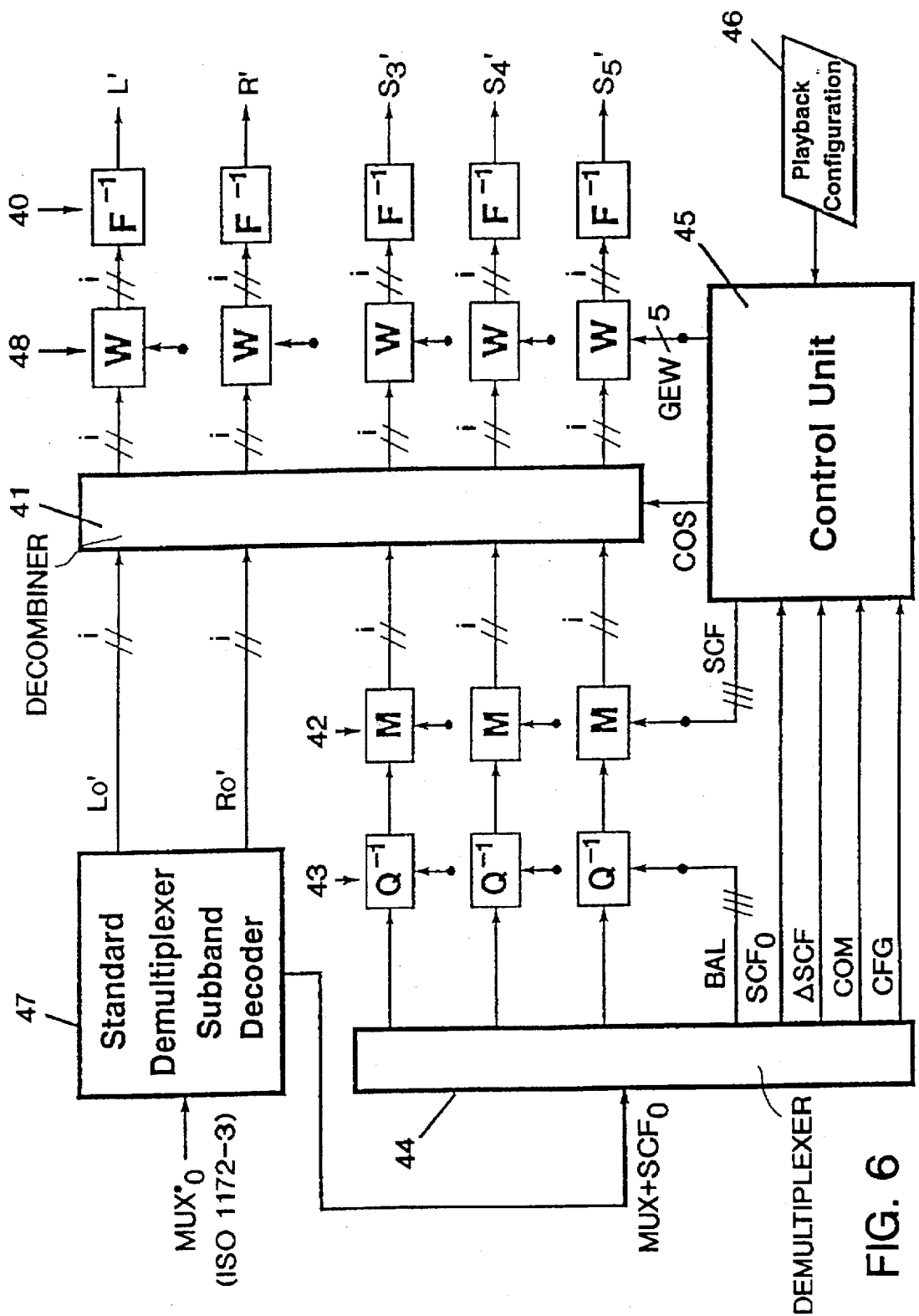

The decoded subband signals Lo', Ro' at the output of the stage 47 and the decoded subband signals T3', T4' and T5' at the output of the multipliers 42 reach the decombiner 41, where the already-mentioned channel allocation or the interchannel-wise linking of the subband signals is effected, with control of the control unit 45, which calculates the control signal COS from the additional information COM and CFG supplied by the demultiplexer 44 and from an input signal EIN. The input signal EIN is entered by a user by way of a playback configuration input 46; it represents the desired listening situation and—in the case of the multilingual television sound—the desired playback language. Furthermore, the user can enter data about level balance and listening dynamics into the control unit 45 by way of the input 46, and, according to these entries, the control unit controls the weighting stages 48, which are downstream of the decombiner 41 and multiply the subband signals at the outputs of the decombiner 41 block-wise with corresponding weighting factors GEW. After subsequent inverse filtering in the synthesis filter banks 40, the broadband, digitalized audio signals L', R', S3', S4' and S5' are present at the outputs of the decoder according to FIG. 4. In contrast to the decoder according to FIG. 4, in the decoder according to FIG. 6 the data stream MUX and the scale factors SCFo of the subband base signals Lo, Ro are separated out of the combined data stream MUXo* in the stage 47 and fed to the demultiplexer 44. The direct feeding of SCFo from the stage 47 to the control unit 45 (FIG. 4) is omitted; rather, in FIG. 6 the scale factors SCFo are fed to the control unit 45 from the demultiplexer 44. Also, the decoder according to FIG. 6 is identical to the decoder according to FIG. 4.

For a detailed explanation of the method according to the invention by way of the embodiments according to FIGS. 3 through 6, first the hearing properties forming the basis of stereophonic coding will be illustrated and, based on this, the measures used for data reduction. Further embodiments, particularly with regard to a flexible utilization of the transmission channels, are described last.

Model of Binaural Signal Processing

Figure 7:
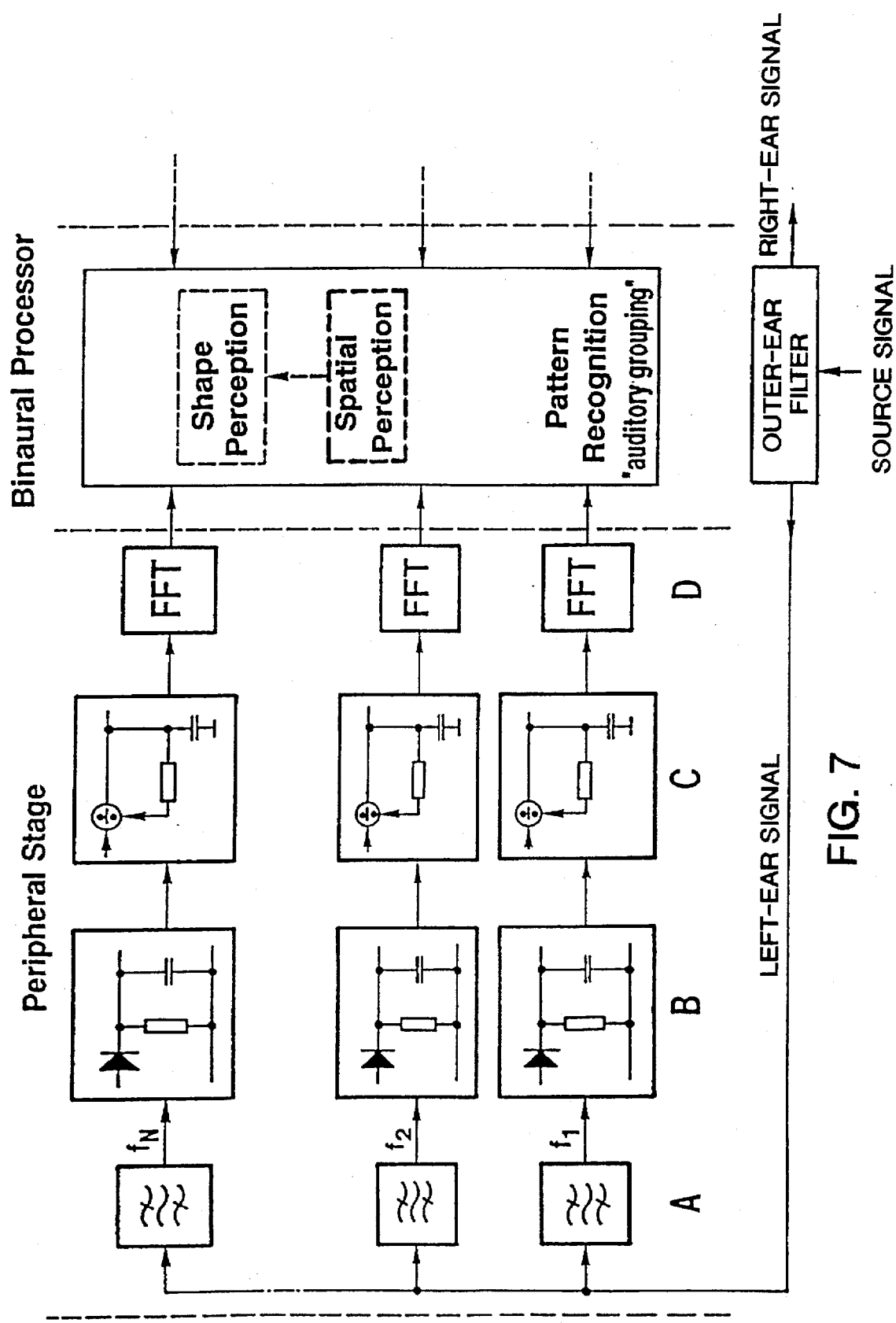
FIG. 7 illustrates a model of the binaural signal processing of human hearing.

For spatial hearing, differences between the acoustic signals at both ears (interaural signal differences) has tremendous significance. In the literature, a plurality of models are distinguished which already permit a comprehensive description of binaural effects. However, the knowledge of the underlying physiological processing mechanisms decreases the further one advances into the central neuronal regions. For this reason the peripheral stages of binaural models are uniform at least in their basic conception, whereas the central model areas either specialize in narrowly-limited, psychoacoustic effects or permit only imprecise statements. A model of binaural signal processing is shown in FIG. 7. The relatively precise description of the peripheral stage by way of the functional blocks A, B, C, D, as well as general assumptions about the mode of operation of the central processing stage ("binaural processor") permit a crude acquisition of the "binaural information." The model according to FIG. 7 includes the following stages:

Outer-Ear Filter:

The effect of the outer ear (pinna, head, torso) on the left and right ear signals is described by way of outer-ear transmission functions (outer-ear filter"). By means of this, a spatial separation as well as a spectral and temporal filtering of the source signal are effected in the sense of a "spatial coding." The effect is negligible below approximately 150 Hz, i.e. correspondingly low-frequency source signals are irrelevant with respect to binaural evaluation.

Peripheral Stage A:

It has not only been proven for monoaural, but also for binaural signal processing that the evaluation of each ear signal takes place in a frequency-selective manner. The hearing separates the ear signals into narrow-band components f1, f2 . . . fn. The analysis bandwidth of the relevant narrow-band filter corresponds to the frequency group widths that are measured in monoaural experiments, i.e. the peripheral frequency selectivity that has also been proven physiologically becomes effective in both monoaural and binaural signal processing.

Peripheral Stage B:

The following model component B for simulating the neuronal properties is also physiologically and psychoacoustically founded. The output signals of the hair cells which sample the mode of oscillation along the basilar membrane are consequences of neural impulses (spikes) whose temporal density increases in the relevant frequency band with an increasing signal level ("pulse frequency modulation"). To describe the properties of the neural impulse series which are important for directional hearing, in a first approximation it is sufficient to provide a simple receptor-neuron model of halfway rectification and subsequent low-pass filtering for each frequency group. The halfway rectification takes into consideration that the hair cells only respond to a half-wave of the basilar membrane oscillation. The low-pass of first order, having a limiting frequency of approximately 800 Hz, serves to obtain the envelope, and takes into consideration that, with rising frequency, the activity probability of the neurons follows the envelope more and more and the fine structure of the basilar membrane less and less, whereas conversely, proportionality exists in the range of low frequencies.

Peripheral Stage C:

The nonlinear stage C formed from a division unit and a fed-back RC element effects a dynamic compression for stationary signals, while rapid changes in the input signal are extensively transmitted in linear fashion. Because of this, masking effects (particularly later masking) are simulated over time; furthermore, the stage C is likewise primarily responsible for important binaural time effects (e.g. "law of the first wave front," "Franssen effect"). The time constant for the drop of the envelope is on the average approximately 50 ms; conversely, for the rise, 1.25 ms=⅛₀₀ Hz. Because of this, a high reduction in information results.

Peripheral Stage D:

The output signals of stage C are subjected to a time-frequency transformation (e.g. Fast Fourier Transformation) in peripheral stage D that represents the spectral properties of the envelope. They change relatively slowly, which corresponds to the changes in the activity states in the acoustic cortex. The frequency-selective output signals are present at the same time as a pattern of the binaural processing stage (binaural processor).

Binaural Processor:

For frequency-selective processing in the binaural processor, the following is assumed:

1. The evaluation is effected by means of pattern-recognition mechanisms, i.e. by means of comparison of the actual signal pattern with a supply of stored (learned) patterns. This is a process in which an actual signal pattern is linked with a stored pattern, even when only parts of the stored pattern are included in the actual signal pattern, or when an only incomplete actual signal pattern is present.

2. A prerequisite for the recognition of spatial properties is coherence of contralateral envelope signals ("binaural envelope coherence"), that is, individual envelope signals from the left and right ear that have the same frequency position represent pattern elements that are evaluated with regard to their binaural information.

3. The binaural information obtained in this manner is then allocated to the corresponding, monoaural information obtained in a separate pattern-recognition process (location- and shape-determining pattern recognition).

Selection of the Stereophonic Information

With respect to stereophonic coding, the model according to FIG. 7 first makes the important statement that the selection of the stereophonic information is possible when the evaluation takes place in a frequency-selective manner, i.e. when a separation into subbands (if possible, over the entire frequency group) is provided. The properties of the frequency-selective signals at the outputs of the stages D and the properties of pattern recognition give indications for coding of the stereophonic additional signals in the subbands.

Accordingly, the envelopes of all subband signals are extremely significant. In the range of higher frequencies (above approximately 1.5 kHz), they do not permit evaluation of the interaural phase differences. This is practical, because above approximately 1.5 kHz the interaural phase difference no longer represents an unequivocal directional feature. Lateralization experiments show that, in the entire audio frequency range (from approximately 150 Hz), interaural level and time differences of the envelopes lead to a lateral deflection of the audio event, but this happens in interaural time differences of the signal fine structures only in the frequency range of up to approximately 1.5 kHz. With amplitude-modulated high-pass noise, one then finds a fusioned audio event when interaural, uncorrelated noise is used, provided that only the two ear signals have the same envelope.

This subband envelope evaluation means, with respect to stereophonic coding, that solely the stereophonic information of the upper subband signals is represented by its envelopes, and that, as a consequence, the stereophonic signals can be combined at higher frequencies when the envelopes of the upper subband signals have been extracted in advance. This stereophonic information is suited for reconstructing a subjectively sufficient channel partitioning in the decoder in that the monophonic subband signals are modulated with the original envelopes. The result is stereophonic signals which are only distinguished with respect to their envelopes, but not with respect to their signal fine structure, and which, however, assure an unimpaired stereophonic audio impression. A prerequisite for this is the sufficiently precise reproduction of the subband envelopes. It has already been proven that, even with crude temporal resolution, the resulting impairments to quality are relatively slight. They can be avoided entirely when the reduction of the channel partitioning is only effected intermittently and particularly more frequently in the uppermost frequency range than beneath it.

The temporal effects which occur in the binaural processor and their evaluation during stereophonic coding are to be observed below. The behavior over time of the signals at the outputs of the stage D and the process of pattern recognition cause limits of the binaural time analysis which are expressed in three effects:

The "Franssen effect" says that two spatially separate noise events produce a single audio event at the location of that loudspeaker which emits the leading (pulse-affected) audio signal. The delayed audio signal is irrelevant for directional allocation.

The "inertia effect" states that changes in direction in predominantly stationary sounds are probable as of a certain duration of change. Therefore, a stereo signal can be switched, for example, to mono for a short time ("soft") without causing interference of the stereophonic sound image.

A common feature of all three effects that can be determined is that a series of short-time noise events is irrelevant with respect to spatial perceptibility, and is therefore unnecessary as spatial information. These irrelevant noise events are even longer the more narrow-banded they are. The position over time of these irrelevant noise events or audio signal segments can be determined by way of the subband signal-envelope courses; in a first approximation they lie directly behind their leading edges.

Features of the Method

The combiner 31 in the encoder (FIGS. 3 and 5) and the decombiner 41 in the decoder (FIGS. 4 and 6) permit the performance or cancellation, respectively, of subband-wise and block-wise, arbitrary matrixings and dematrixings. Resulting from this are, on the one hand, advantageous options of data reduction and, on the other hand, options of the alternative use of the audio-transmission channels, for example transmission of alternative language, as a function of the selection of the system configuration by means of the input 36 (FIGS. 3 and 5).

System Configuration A

This system configuration represents the data reduction for five-channel, stereophonic signals, i.e. it is

S3=C
S4=LS
S5=RS.

The combiner 31 in the encoder according to FIGS. 3 and 5 matrixes the signals L, R, C', LS', RS' according to the equations (1) through (5), while in the decombiner 41 of the decoder according to FIGS. 4 and 6, dematrixing takes place according to equations (6) through (10). The data reduction takes place through the following measures:

1. Dynamic Cross-Talk

A high data reduction for the additional signal packet T3/T4/T5 can be achieved in that, in accordance with a suitable signal analysis in the analysis stage 35, dematrixing is canceled block-wise in individual subbands. This takes place with the aid of a block-wise, so-called "puncture-coding" of subband signals of the additional signal packet T3/T4/T5 (equations (3), (4), (5)). In puncture coding the sampling values of the corresponding subband signal are set to zero in the combiner 31 on the side of the encoder, and/or the quantizer 33 according to the control signal COS and/or the bit allocation information BAL. On the side of the decoder, the missing sampling values in the subbands are substituted by transmitted sampling values in the subbands of other audio channels, but of the same frequency position according to the control signal COM. The substituted sampling values are subsequently weighted in the stages 48 such that an adaptation to the original subband signal level conditions is effected. To perform this adaptation, the weighting factor GEW (FIGS. 3 and 5) is calculated in the control unit 45 from the scale factors SCF and the combiner mode COM, for example by means of interpolation of sequential scale factors, to prevent "hard" level jumps.

The rules for the application of puncture coding are the result of different hearing properties described in detail above. Essentially, puncture coding takes place in such a way that the information relevant for binaural signal processing remains in the additional signal packet T3/T4/T5. Hence, the individual signals combined in the stereo base signal packet Lo/Ro can be allocated on the decoder side to the original audio channels so far that the stereophonic audio image is subjectively reconstructed.

The audio signals are analyzed in the analysis stage 35 with regard to the following puncture-coding criteria:
subband signal dynamics According to the "Franssen effect" and the "law of the first wave front," subband signal packets that follow a transient and behave in a stationary or quasi-stationary manner can be puncture-coded.
envelope evaluation The evaluation of the envelopes of the subband signals in the binaural model according to FIG. 7 permits more frequent execution of puncture-coding in detail bands of a higher frequency position than in the subbands of lower frequency position.
signal energy conditions The energy of a subband can be derived from its scale factors SCF. The summation of the signal energies of all of the subbands results in the signal energy of the entire audio signal. A further criterion for puncture encoding can be derived from the comparison of the signal energy of the individual subbands with the signal energy of the entire audio signal. And puncture encodings can take place more frequently in those subbands in which the signal energy is relatively low with respect to the signal energy of the entire audio signal. "Relatively low" is to be understood as, for example, a ratio of 1/i, where i is the number of subbands per audio channel.

inertia effect of human hearing

As already mentioned above, the "inertia effect" of human hearing is to be understood as changes in direction in predominantly stationary sounds being perceptible as of a certain duration of change. Two options of puncture coding result:

a) If only a short-time change in direction is detected in the decoder, the subbands responsible for it can nevertheless be puncture-coded.

b) When puncture codings only take place for a short time, for example for reasons of a short-time overload of the transmission channel for the data stream MUX, the hearing can perceive the interferences in the spatial image caused by this.

partial adjacent-channel masking

The above-mentioned effect of "adjacent-channel masking" can not only be employed to establish quantization or to suppress individual subband signals—as will be described in detail below—but also used as a further puncture-coding criterion. For example, such subbands that are only partly, that is, not completely masked by adjacent channels are puncture-coded sooner than such subbands that are not subjected to adjacent-channel masking.

utilization of redundancy

Because of the compatibility matrixing according to equations (1) through (5), intermittent, individual subband signals of T1 and/or T2 are completely or nearly identical to corresponding subband signals of the same frequency position of T3, T4 and/or T5. Because of this redundancy, the transmission of identical subband signals of the same frequency position in the additional signal packet T3/T4/T5 can be omitted. On the decoder side, the puncture-coded subband signals of the additional signal packet T3/T4/T5 are substituted only in their original audio channel during recombination. If, for example, a subband signal of the center channel S3 in the additional signal packet T3/T4/T5 is missing, on the decoder side it must be ensured that, from the left or right signal of the stereo base signal packet Lo/Ro, substitution only takes place in the center playback channel S3', but not in the two other playback channels S4' and S5' (FIG. 4). Moreover, the center components in the stereo base signals Lo' and Ro' must be suppressed by the decombiner 41, because, due to the missing center channel, dematrixing according to equations (6) through (8) is no longer possible.

alias distortions

As a consequence of the incomplete reconstruction of the audio signal in the decoder as stipulated by puncture coding, the extinction of the alias distortions is not performed completely during back-filtering in the synthesis filter banks 40 (FIGS. 4 and 6). These remaining alias distortions can be predetermined in the encoder, so that their masking can be calculated. No puncture coding can take place without masking.

negative correlation

If a negative correlation occurs, that is, phase opposition, between subband signals of the same frequency position, the consequence of this in matrixing according to equations (1) and (2) is that extinctions occur in the left or right signal of the stereo base signal packet Lo/Ro. These extinctions are canceled during dematrixing according to equations (6) and (7). This cancellation ceases, however, when one of the signals T3. T4 or T5 is not transmitted as a consequence of a puncture coding. For this reason, no puncture coding may take place during determination of a negative correlation.

2. Common Perceptual Threshold

The bit allocation of the subband signals in the individual audio channels is calculated on the basis of the signal/masking interval in the consideration of all audio channels and all i subbands. The signal/masking interval is to be understood as minimal perceptual threshold in a subband.

It is therefore necessary to determine the maximum signal level for each of the audio channels and the minimum perceptual threshold per subband and per temporal block. The minimum perceptual threshold is calculated in the analysis stage 35 (FIGS. 3 and 5) from a Fourier analysis which is switched in parallel with the subband filtering and is followed by a psychoacoustic model. This parallel concept has the advantage that an inadequate frequency separation of the filter bank 30 can thus be compensated, because on the one hand a good spectral resolution—determined by the Fourier analysis—is necessary for determining the spectral perceptual threshold and, on the other hand, a good time resolution—determined by the filter bank 30—of the individual audio channels is given.

Because of this parallel concept, frequencies and levels of alias components can also be determined, which is particularly important with regard to the operations performed by the combiner 31 (FIGS. 3 and 5). The decisions of this special signal analysis in 35 are also inserted into the control signal COS, which controls the combiner 31.

Experiments have shown, for example, that approximately 24 ms suffice for the temporal block for calculating the perceptual threshold; this corresponds to 1152 input PCM values at a sampling frequency of the audio channels of 48 kHz, and represents a good compromise between temporal series of the audio signal and/or structural complexity of the analysis stage 35.

The calculation of the more precise frequency resolution is, however, only necessary on the side of the encode, not in the decoder, which is important for mass-production of decoders.

The calculation of the common perceptual threshold and the signal/masking interval derived therefrom is based on the following steps:

1. Step

Calculation of the Fourier transformation for time/frequency transformation of the individual audio channel signals.

2. Step

Determination of the signal level in each subband for each audio channel signal.

3. Step

Determination of the resting threshold, where an additional margin of safety is employed to increase the transmission dynamics.

4. Step

Determination of the tonal components, that is, the components represented by a pure sound, and the noisier components of a audio channel in order to have available a difference in tonal maskers and noise maskers.

5. Step

Reduction in the tonal and noisy components to components that are acousto-physiologically relevant by taking into consideration the mutual masking of these components and masking by the resting threshold.

6. Step

Calculation of the individual perceptual thresholds of the relevant components of the tonal and noisy components.

7. Step

Determination of the global perceptual threshold per audio channel.

8. Step

Determination of the minimum perceptual threshold in each subband per audio channel.

9. Step

Determination of the maximum value of all minimum perceptual thresholds in subbands of the same frequency position of the unmatrixed audio channel signals L, R, C, LS, RS.

10. Step

Consideration of the effect of a reduced masking in spatially-separated masking ("Masking Level Difference"= MLD) in the determination of the maximum value according to Step 9 in the sense of a reduction in the determined maximum value.

11. Step

Consideration of an expansion of the audible zone in the determination of the maximum value according to Steps 9 and 10. Because the calculation of the MLD is essentially only valid for a single audible location, the maximum value determined according to Steps 9 and 10 additionally reduces the common perceptual threshold.

System Configuration B

This system configuration is represented on the one hand by a data reduction of a known type for the dual-channel stereophonic signals L and R and, on the other hand, by a data reduction that is completely independent thereof for channels S3, S4 and S5. The channels S3, S4 and S5 can have program contents that are independent of one another—for example, they can be used strictly as comment channels; however, they can also encompass a further stereophonic audio signal pair and an unused or an arbitrary other audio channel. In system configuration B no matrixing of the audio channels takes place in the combiner 31, that is, the combiner 31 is functionless. The calculation of a common perceptual threshold for the channels S3 through S5 no longer takes place in the analysis stage 35; rather, for each individual channel S3 through S5, the individual perceptual threshold is calculated, from which correspondingly different bit allocation information BAL is generated for the quantization stages 33. Furthermore, a data reduction according to the rules of dynamic cross-talk (puncture coding) does not take place in the analysis stage 35. The encoder according to FIG. 5, in which the data stream MUX is merged into the data stream MUXo, is particularly advantageous for configuration B. All five audio channel signals whose bit flow respectively varies over time are inserted into a common, fixed data frame. Because the bit flow fluctuations of the five audio channels approximately compensate in the statistical average, an improved utilization of the transmission or storage capacity of the combined data stream MUXo* results.

On the decoder side, the decombiner 41 in the system configuration B can be used as a channel selector and a channel mixer, depending on the control of the control unit 45 by the playback configuration input 46.

Moreover, the analysis stage 35 of the encoder in system configuration B produces no difference scale factor values SCF; instead, the scale factor values SCF of the channels S3 through S5 are further conducted to the multiplexer 34, in coded form as the case may be. On the encoder side, the scale factors SCFo are ignored by the control unit 45.

What is claimed is:

1. A method of transmitting or storing digitalized, multi-channel audio signals, comprising the steps of:
    (a) encoding the multi-channel audio signals, step (a) including
        (1) for each audio channel, generating a number of spectral subband signals;
        (2) analyzing the subband signals to obtain
            a dynamic control signal which is oriented toward a binaural, psychoacoustic model,
            combiner mode information which is derived from the dynamic control signal,
            bit allocation information, and
            for each subband signal, a scale factor that classes a peak value of the respective subband signal within a certain time block;
        (3) combining the subband signals of different audio channels, but which have the same frequency position, to obtain combined subband signals, step (a-3) being conducted in an interchannel manner according to the dynamic control signal;
        (4) normalizing the combined subband signals using the scale factors to obtain normalized subband signals; and
        (5) quantizing the normalized subband signals to obtain encoded subband signals in accordance with a channel-specific, intra-channel perceptual threshold of human hearing, step (a-5) being controlled by the bit allocation information;
    (b) transmitting or storing the encoded subband signals, the bit allocation information, the scale factors, and the combiner mode information; and
    (c) decoding and processing the encoded subband signals, step (c) including
        (1) decoding the encoded subband signals according to the bit allocation information to obtain decoded subband signals;
        (2) decombining the decoded subband signals of different audio channels, but the same frequency position, to obtain decombined subband signals, step (c-2) being conducted as a function of the combiner mode information;
        (3) denormalizing the decombined subband signals according to the scale factors, to obtain denormalized subband signals; and
        (4) generating a broadband digital audio signal from the denormalized subband signals.

2. A method according to claim 1, wherein step (a) comprises effecting puncture coding with the aid of at least one of the dynamic control signal and the bit allocation information, so that encoded subband signals for relevant subbands need not be transmitted or stored in step (b), wherein step (c) comprises substituting the non-transmitted or non-stored encoded subband signals in the relevant subbands by transmitted or stored encoded subband signals in the subbands of other audio channels, but of the same frequency position, according to the combiner mode information, and wherein the substituted encoded subband signals are adapted with respect to their level to original level conditions of the relevant subbands.

3. A method according to claim 2, further comprising the step of calculating weighting factors, with which the substituted encoded subband signals are weighted, from the scale factors for the level adaptation.

4. A method according to claim 2, wherein the puncture coding is effected as a function of a determination of a sequence of a transient and a stationary signal state of the same audio channel or adjacent audio channels.

5. A method according to claim 2, wherein the puncture coding occurs more frequently in subbands of higher frequency position than in subbands of lower frequency position.

6. A method according to claim 2, wherein an entire audio signal is comprised of the multi-channel audio signals, and the puncture coding occurs more frequently in subbands in which the signal energy is relatively low with respect to the signal energy of the entire audio signal.

7. A method according to claim 2, wherein the puncture coding is effected with the utilization of the inertia effect of human hearing.

8. A method according to claim 2, wherein the puncture coding is effected with the utilization of the psychoacoustic masking of adjacent audio channels.

9. A method according to claim 2, wherein the puncture coding is effected with the utilization of redundancy in subbands of the same frequency position of adjacent audio channels, and wherein during step (c) the substituted encoded subband signals are only substituted in their original audio channel during recombination.

10. A method according to claim 2, wherein the step (a) further comprises the step of determining whether alias distortions exists, and wherein the puncture coding is only effected when alias distortions are irrelevant with respect to properties of human hearing.

11. A method according to claim 2, wherein puncture coding is not effected when a negative correlation exists between subband signals of the same frequency position.

12. A method of transmitting or storing digitalized audio signals for a plurality of intercorrelated audio channels, the intercorrelated audio channels including a left channel, a right channel, and at least one further channel, said method comprising the steps of:

(a) encoding the audio signals, step (a) including
  (1) for each audio channel, generating a number of spectral subband signals;
  (2) analyzing the subband signals to obtain
    bit allocation information which is derived from a common perceptual threshold, the common perceptual threshold being formed from all of the audio channels, and
    for each subband signal, a scale factor that classes a peak value of the respective subband signal within a certain time block;
  (3) normalizing signals which are derived from the subband signals, using the scale factors, to obtain normalized subband signals; and
  (4) quantizing the normalized subband signals to obtain encoded subband signals in accordance with a channel-specific, intra-channel perceptual threshold of human hearing, step (a-4) being controlled by the bit allocation information;

(b) transmitting or storing the encoded subband signals, the bit allocation information, and the scale factors; and (c) decoding and processing the encoded subband signals, step (c) including
  (1) decoding the encoded subband signals as a function of the bit allocation information to obtain decoded subband signals;
  (2) denormalizing signals derived from the decoded subband signals according to the scale factors, to obtain denormalized subband signals; and
  (3) generating a broadband digital audio signal from the denormalized subband signals.

13. A method according to claim 12, wherein the common perceptual threshold is calculated with consideration of a masking difference in playback.

14. A method according to claim 12, wherein the at least one further channel includes a center channel, a left surround channel, and a right surround channel.

15. A method of transmitting or storing digitalized, multi-channel audio signals, comprising the steps of:

(a) encoding the multi-channel audio signals, step (a) including:
  (1) for each audio channel, generating a number of spectral subband signals;
  (2) analyzing the subband signals to obtain
    bit allocation information, and
    for each subband signal, a scale factor that classes a peak value of there spective subband signal within a certain time block;
  (3) combining the subband signals of different audio channels, but which have the same frequency position, to obtain combined subband signals, step (a-3) being conducted as a function of an audio representation format of the audio channel corresponding to a system configuration;
  (4) normalizing the combined subband signals using the scale factors to obtain normalized subband signals; and
  (5) quantizing the normalized subband signals to obtain encoded subband signals in accordance with a channel-specific, intra-channel perceptual threshold of human hearing, step (a-5) being controlled by the bit allocation information;

(b) transmitting or storing the encoded subband signals, the bit allocation information, the scale factors, and a control signal which is derived from the audio representation format; and (c) decoding and processing the encoded subband signals, step (c) including
  (1) decoding the encoded subband signals according to the bit allocation information to obtain decoded subband signals;
  (2) decombining the decoded subband signals of different audio channels, but the same frequency position, to obtain decombined subband signals, step (c-2) being conducted as a function of the control signal;
  (3) denormalizing the decombined subband signals according to the scale factors, to obtain denormalized subband signals; and
  (4) generating a broadband digital audio signal from the denormalized subband signals.

* * * * *